United States Patent [19]

Suzuki et al.

[11] Patent Number: 4,848,882

[45] Date of Patent: Jul. 18, 1989

[54] GRADIENT INDEX LENS

[75] Inventors: Masayuki Suzuki; Jun Hattori, both of Atsugi, Japan

[73] Assignee: Canon Kabushiki Kaisha, Tokyo, Japan

[21] Appl. No.: 27,737

[22] Filed: Mar. 19, 1987

[30] Foreign Application Priority Data

Mar. 25, 1986 [JP] Japan .................................. 61-067583
Sep. 26, 1986 [JP] Japan .................................. 61-229082

[51] Int. Cl.$^4$ ............................. G02B 3/00; G02B 6/32
[52] U.S. Cl. ................................... 350/413; 350/96.18
[58] Field of Search ...................... 350/413, 416, 96.18

[56] References Cited

U.S. PATENT DOCUMENTS 3,666,347 5/1972 Kitano et al. ........................ 350/416
3,729,253 4/1973 Moore et al. ........................ 350/413

*Primary Examiner*—Bruce Y. Arnold
*Assistant Examiner*—Rebecca D. Gass

*Attorney, Agent, or Firm*—Fitzpatrick, Cella Harper & Scinto

[57] ABSTRACT

A gradient index lens includes a first surface comprising a convex surface, a second surface comprising a convex surface, the convex surface of the second surface sharing the center of curvature with the convex surface of the first surface, and an index gradient $N(\rho)$ formed in the medium of the lens. The index gradient $N(\rho)$ is expressed as $$N(\rho) = N_0 + N_2\rho^2 + N_3\rho^3 N_4\rho^4 + N_5\rho^5 + \ldots$$

where $N_0$ is the refractive index at the center of curvature, $N_k$ ($k = 2, 3, 4, \ldots$) are the index gradient coefficients, and $\rho$ is the distance from the center of curvature, and at least one of the index gradient coefficients $N_k$ in which $k \geq 3$ is greater than 0. The lens satisfies the following conditions:

$1.45 < N_0 < 1.9$
$-0.4 < N_2 f^2 < -0.2$ where f is the focal length of the lens.

20 Claims, 6 Drawing Sheets

GRADIENT INDEX LENS

BACKGROUND OF THE INVENTION

1. Field of the Invention

This invention relates to a so-called gradient index lens in the medium of which the refractive index varies.

In particular, the present invention relates to a biconvex lens provided with a pair of convex surfaces sharing the center of curvature, such as a spherical lens.

2. Related Background Art

A spherical lens called a Luneburg lens is well known as a gradient index lens having a sphere-symmetrical index gradient. The index gradient of the Luneburg lens is represented by $N(\rho) = \sqrt{2-\rho^2}$ (the radius is 1), where $\rho$ is the distance from the center of the sphere, and the refractive index at the center of the sphere in 1.41 and the reflective index near the surface is 1. The disadvantages peculiar to the gradient index lens are that (1) the refractive index thereof is too low and no suitable material is available, and (2) the refractive index difference between the center of the sphere and the outermost periphery of the sphere is as great as about 0.41 and it is difficult to provide the lens with an index gradient, and these disadvantages have led chiefly to the problems in the manufacture. As a means for solving the former of these disadvantages of the Luneburg lens, it occurs to mind to fill one of the light beam incidence and emergence surfaces of the lens with a medium of a refractive index $N_0$ with the index gradient of the spherical lens as $N(\rho) = N_0\sqrt{2-\rho^2}$, and this is disclosed, for example, in U.S. Pat. No. 4,327,963. Again in this case, however, the refractive index difference between the center of the sphere and the outermost periphery of the sphere is as great as 0.6, and the gradient index lens disclosed therein could hardly be realized.

SUMMARY OF THE INVENTION

In view of the above-noted problems peculiar to the prior art, it is an object of the present invention to provide a gradient index lens which has a small refractive index difference and is easy to manufacture.

It is a further object of the present invention to provide a gradient index lens in which practically sufficient aberration correction has been done and which has a wide angle of view and a wide numerical aperture (NA).

To achieve the above objects, one form of the gradient index lens according to the present invention is characterized in that it has a light beam incidence surface and a light beam emergence surface, the refractive index of the lens medium existing between the light beam incidence and emergence surfaces has a maximum value on the optic axis or on the lens surface and said refractive index continuously varies in a direction substantially orthogonal to the optic axis, and the minimum value of said refractive index exists in the other interior of the medium than the lens surface.

Also, to achieve the above objects, another form of the gradient index lens according to the present invention is characterized in that it has a substantially spherical configuration and is provided with an index gradient substantially sphere-symmetrical about the center of the sphere, and when said index gradient is expressed as $$N(\rho) = N_0 + N_2\rho^2 + N_3\rho^3 + N_4\rho^4 + N_5\rho^5 + \ldots,$$

where $N_0$ is the refractive index at the center, $N_k$ ($k=2, 3, 4, \ldots$) are the index gradient coefficients, $\rho$ is the distance from the center of the sphere, and f is the focal length, at least one of the index gradient coefficients $N_k$ in which $k \geq 3$ is a positive value and the following conditions are satisfied:

(1) $1.45 < N_0 < 1.9$ (2) $-0.4 < N_2 f^2 < -0.2$.

The lens having said substantially spherical configuration is merely one form of the present invention. According to the present invention, the biconvex lens configuration having a pair of convex surfaces sharing the center of curvature is a feature of its configuration.

Further features of the present invention are described in various embodiments which will hereinafter be described.

Also, by providing a lens which satisfies the aforementioned conditions (1) and (2) and satisfies the aforementioned condition about the gradient shape, there can be provided an optical system in which aberrations are well corrected and which has a wide angle of view.

DESCRIPTION OF THE PREFERRED EMBODIMENTS

Figure 1A:
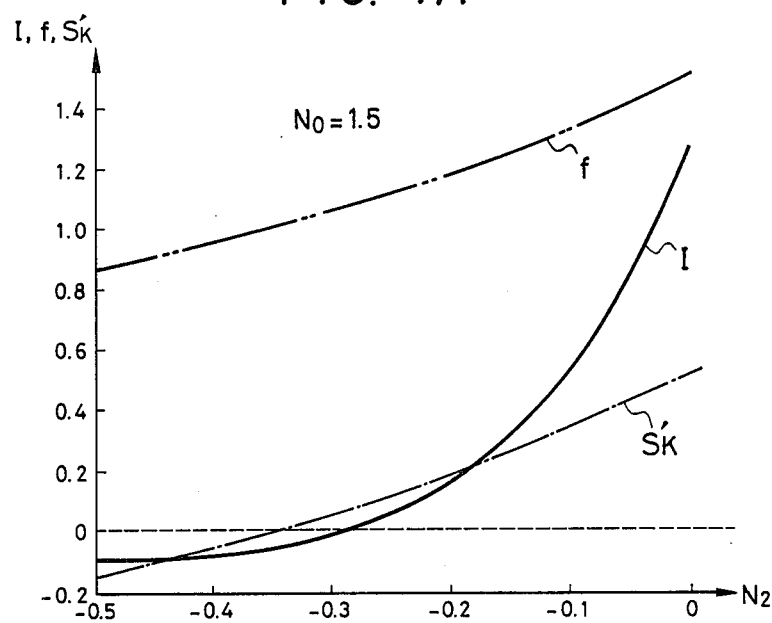
FIGS. 1A and 1B are graphs showing the optical characteristics of gradient index lenses which are spherical in configuration and which have a sphere symmetrical index gradient whose center is the center of the sphere.
Figure 1B:
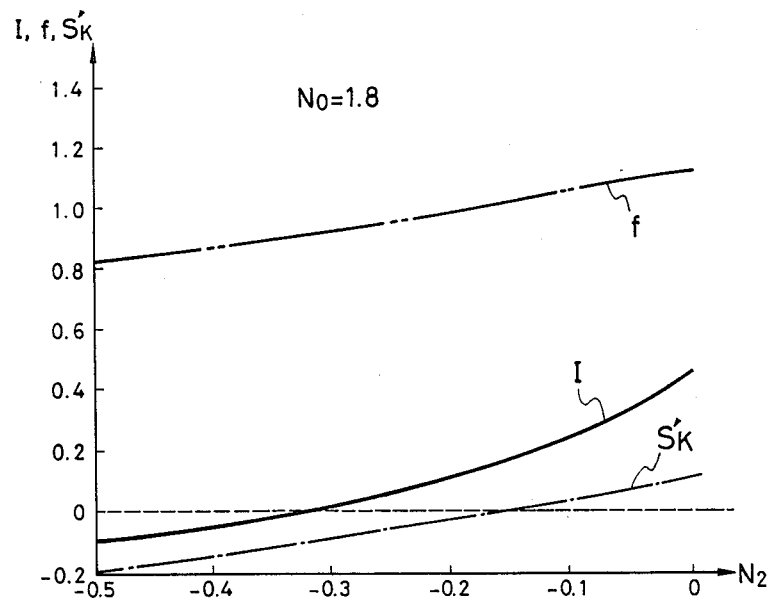

FIGS. 1A and 1B are graphs showing the relations of the third-order spherical aberration coefficient I, the focal length f and the back focal length Sk' of a gradient index spherical lens provided with a sphere radius 1 and index gradient $N(\rho)=N_0+N_2\rho^2$ for the infinity object point to an index gradient coefficient $N_2$, and more specifically, FIG. 1A shows the relations when the refractive index $N_0$ at the center of gradient is $N_0=1.5$, and FIG. 1B shows the relations when the refractive index $N_0$ at the center of gradient is $N_0=1.8$.

From FIGS 1A and 1B, it is seen that in the gradient index lens of this type, as the value of the index gradient coefficient $N_2$ is a greater negative (minus) value, the spherical aberration coefficient I, the focal length f and the back focal length Sk' all decrease and that particularly when $N_2 \cong -0.3$, the spherical aberration coefficient I is zero. Also, at this time, the back focal length Sk' becomes a value approximate to zero and further, the focal length f becomes a value approximate to 1.

However, when $N_2 \cong -0.3$, in said index gradient, there occurs a refractive index difference of about 0.3 between the center of the sphere and the vicinity of the outer periphery of the sphere and thus, the lens is difficult to make as has heretofore been so.

Accordingly, in the present invention, as described above, noticing that the value of the index gradient coefficient $N_2$ governs chiefly the third-order spherical aberration, the condition that $N_2 f^2 \approx -0.3$ is maintained and the third-order spherical aberration coefficient I is rendered into about zero and at the same time, at least one of high-order index gradient coefficients such as $N_3$, $N_4$ and $N_5$ is rendered into a positive value, whereby a reduced refractive index difference is achieved. Also, by the values of the high-order index gradient coefficients such as $N_3$, $N_4$ and $N_5$ representative of index gradients being thus controlled, high-order spherical aberration can be corrected while the back focal length Sk' of the lens is kept substantially at zero.

Further, for the use at high NA, the index gradient is controlled so that from the center of the sphere to the periphery thereof, the refractive index once decreases and again increases. That is, an index gradient is imparted to the lens so that the refractive index has a maximum value at the center or the outer peripheral portion of the sphere present on the optic axis and that the minimum value of the refractive index exists in the interior of the other lens medium than the outer peripheral portion of the sphere.

Imparting such an index gradient is greatly effective for the correction of high-order spherical aberrations. That is, in the present gradient index lens, the light beam incidence and emergence surfaces are substantially spherical and therefore, away from the optic axis, the refraction effect (positive power) on the light rays on the incidence surface is extremely intensified. Accordingly, the index gradient may be controlled so that the transfer power of the interior of the lens changes from a positive power to a negative power so as to correct (decrease) this excessive refraction effect.

On the other hand, in the present gradient index lens, under-chromatic aberration is generated by the refraction on a first refractive surface present on the object side, but by controlling the index gradient of the lens medium, over-chromatic aberration can be positively generated in the interior of the lens to correct said under-chromatic aberration.

For this purpose, as the condition of the index gradient to be imparted to the present gradient index lens, it may be mentioned to render the portion provided with a positive power in the area wherein an index gradient is present into low dispersion (great Abbe number) and render the portion provided with a negative power into high dispersion (small Abbe number). That is, in an index gradient wherein the refractive index once decreases and again increases from said center of the sphere to said peripheral portion thereof, a material may be suitably selected and set so that the dispersion near the center of the sphere is small and the dispersion in the peripheral portion of the sphere is great.

Also, if the specification is so severe that a suitable material is an available, it is possible to stop down the aperture by a diaphragm or the like to thereby substantially eliminate chromatic aberration and satisfy the specification. Irrespective of whether the aforedescribed condition of dispersion concerned in the elimination of chromatic aberration is or is not satisfied, the aforedescribed condition concerned in the elimination of spherical aberration is established for any wavelength used.

In view of the above-noted point, the present invention provides a gradient index lens which satisfies the aforementioned conditions (1) and (2) which are mentioned again below.

(1) $1.45 < N_0 < 1.9$
(2) $-0.4 < N_2 f^2 < -0.2$

Further, in the present invention, as previously described, at least one of high-order index gradient coefficients $N_3$, $N_4$, $N_5$, ... is rendered into a predetermined positive value, whereby the difference between the maximum refractive index and the minimum refractive index is made small.

Condition (1) is a condition regarding the refractive index $N_0$ at the center of the sphere derived with the usable material and the ease of manufacture taken into account, and if the value of $N_0$ deviates from this range, it will become difficult to make the present gradient index lens. Also, condition (2) is a condition for eliminating spherical aberration as previously described, and if the lower limit of this condition is exceeded, over-spherical aberration will occur, nd if the upper limit of this condition is exceeded, under-spherical aberration will occur to make it impossible to obtain a desired imaging performance.

In the foregoing description, the expression representing the index gradient is represented in the form of infinite series, but for example, use may approximately be made of up to the sixth terms in $$N(\rho)=N_0+N_2\rho^2+N_3\rho^3+N_4\rho^4+N_5\rho^5+N_6\rho^6$$

to suppose the index gradient and design the lens. Likewise in this case, the index gradient $N(\rho)$ is controlled so that the aforementioned conditions (1) and (2) are satisfied and the value of at least one of the index gradient coefficients $N_3$, $N_4$, $N_5$ and $N_6$ is made positive.

Further, if the lens is made so as to satisfy the above-mentioned conditions (1) and (2) and satisfy the above-mentioned condition of dispersion, there can be provided a gradient index lens in which spherical aberration and chromatic aberration are well corrected.

Now, where the gradient index lens according to the present invention is used in an image pickup optical system, it is preferable to make the image pickup surface thereof spherical. Also, when considering the off-axis imaging characteristic, it is preferable that particularly the image pickup surface be concentric with the gradient index lens. In this case, coma and astigmatism do not occur even in off-axis imaging. Also, negative curvature of image field occurs slightly at a finite object distance, but generally this also is a practically allowable amount. Accordingly, if spherical aberration and chromatic aberration are corrected in accordance with the aforementioned conditions, the off-axis imaging characteristic will be naturally improved and therefore, it will be very easy to provide the lens with a wide angle of view. In this case, however, similarly to a so-called $f\theta$ lens, the image height is proportional to the angle of view $\theta$ and negative distortion occurs. It is difficult to optically correct it, but if photoelectric converting means such as CCD is used as the image pickup means, it will be easy to correct it by electrical image processing.

Also, it is desirable that as described above, the image pickup surface be formed concentrically with the gradient index lens, but when focusing is to be effected with the spacing between the image pickup surface and the spherical lens being varied, the curvature of the image pickup surface must be continuously varied to satisfy this relation, and this is not practical. As a matter of course, it is preferable in practice that the radius of curvature $r_i$ of the image pickup surface be fixed. It is desirable that the then radius of curvature $r_i$ should satisfy the following relation:

$$f \leq r_i \leq sf/(s-f) \quad (3)$$

the f is the focal length of the aforedescribed gradient index lens, and s is the distance from the close object point to the center of the gradient index lens. The right side of expression (3) shows the paraxial image surface position relative to the close object point (the distance from the center of the lens). By selecting the value of $r_i$ so as to satisfy expression (3), the deviation of the image pickup surface from the concentric spherical surface can be reduced in the entire focusing range from infinity to the close distance and the off-axis imaging characteristic can be kept good.

Also, it is desirable that $r_i$ should satisfy the following relation:

$$f \leq r_i \leq f + \frac{f^2}{2(s-f)} \quad (4)$$

As previously described, where the image pickup surface is concentric with the lens, negative curvature of image field occurs at the finite object distance and, as the object distance is smaller, the amount of the negative curvature of image field increases. On the other hand, when the radius of curvature $r_i$ of the image pickup surface satisfies expression (4), $r_i$ becomes smaller than the radius of curvature of the concentric spherical surface as the object approaches the close distance, and this is in the direction in which it offsets the occurrence of the negative curvature of image field. That is, when the curvature of image field is taken into consideration, the relation of expression (4) is satisfied, whereby the off-axis imaging characteristic, particularly, the off-axis imaging characteristic near the close distance can be kept better.

Further, if the image surface is made spherical, the off-axis image surface illumination will be great as compared with that in the ordinary photographic lens. That is, in the ordinary photographic lens, the off-axis image surface illumination is reduced in proportion to the fourth power of the cosine of a half angle of view, while in the gradient index lens of the present invention, it is only proportional to the first power of the cosine of a half angle of view. Accordingly, there is the effect that the reduction in the image surface illumination in the range of wide angle of view is greatly improved as compared with the prior art.

Description has been made of the case where focusing is effected with the spacing between the image pickup surface and the present gradient index lens being varied, but of course, use can be made with said spacing being fixed. In such case, only the object to be photographed which lies in the depth of field is sharply photographed, but if the vicinity of the close distance is not called to account, the lens will be practically usable. Also, it is advantageous to the construction of the image pickup system that the image pickup surface is placed in intimate contact with or near the present gradient index lens.

Specific embodiments of the gradient index lens according to the present invention will be shown below.

Table 1 below shows first to twenty-second numerical embodiments of the present gradient index lens In Table 1, $N_0$ represents the refractive index at the center of the sphere, $N_k$ ($k=2, 3, 4, \ldots$) represents the gradient coefficient of the index gradient $$N(\rho) = N_0 + N_2\rho^2 + N_3\rho^3 + N_4\rho^4 + N_5\rho^5 + \ldots,$$

f represents the focal length, and NA represents the numerical aperture for showing the range of aberration correction. Here, design is made with the radius of the lens being equal to the focal length f. Also, in Table 1, all the numerical values are values normalized with the focal length f as $f=1$, and the object distance is assumed as infinity.

Figure 2A:
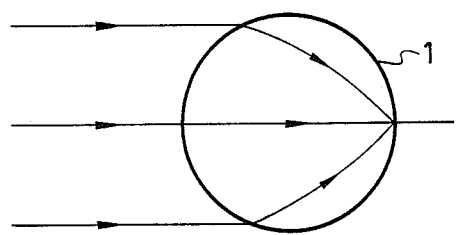
FIGS. 2A, 2B and 2C show a gradient index lens shown in the seventh embodiment of the numerical embodiments of the present invention, FIG. 2A being an optical path illustration, FIG. 2B being a graph of the index gradient, and FIG. 2C being a spherical aberration graph.
Figure 2B:
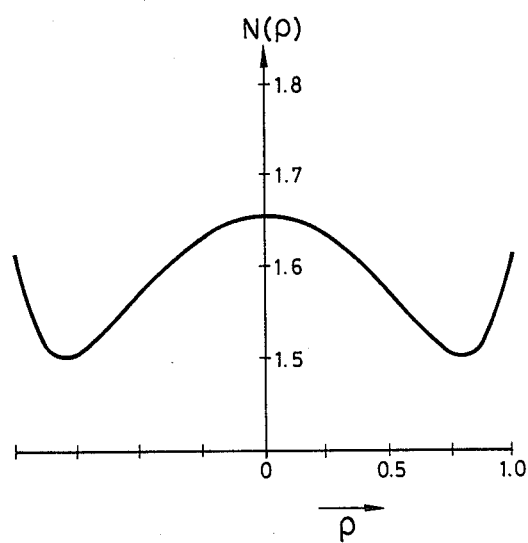
Figure 2C:
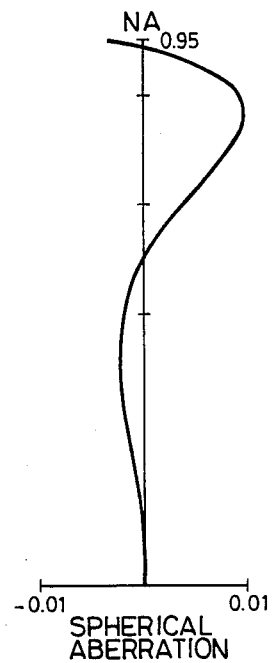
Figure 3A:
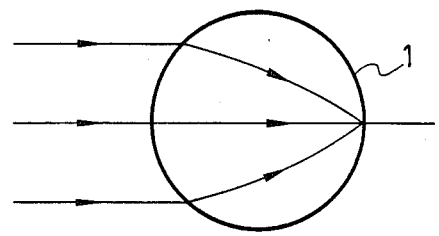
FIGS. 3A, 3B and 3C show a gradient index lens shown in the fourteenth embodiment of the numerical embodiments of the present invention, FIG. 3A being an optical path illustration, FIG. 3B being a graph of the index gradient, and FIG. 3C being a spherical aberration graph.
Figure 3B:
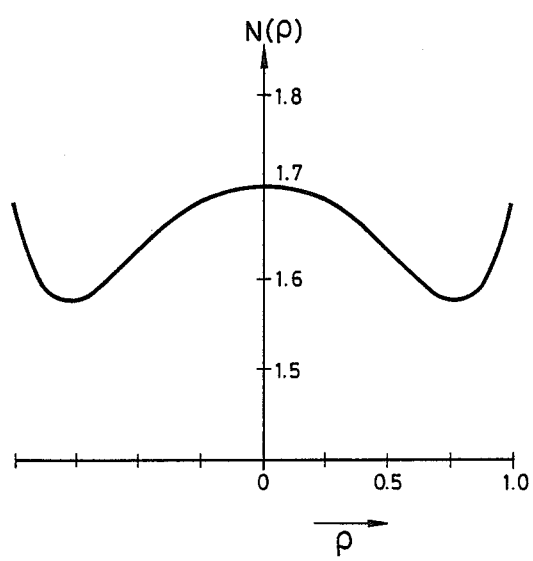
Figure 3C:
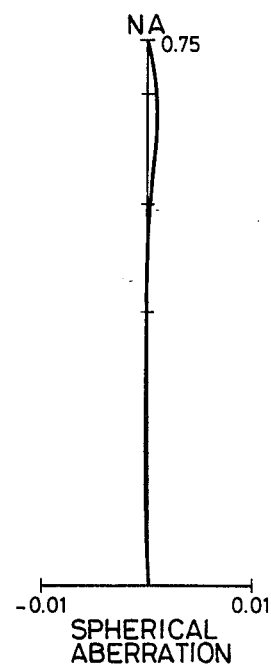

FIGS. 2A, 2B and 2C and FIGS. 3A, 3B and 3C show the gradient index lenses according to the seventh and fourteenth embodiments, respectively, in Table 1. FIGS. 2A and 3A show the optical paths, FIGS. 2B and 3B show the index gradients, and FIGS. 2C and 3C show spherical aberrations. The lens of FIG. 2 is shown as a typical example of the gradient index lens in which NA=0.95, and the lens of FIG. 3 is shown as a typical example of the gradient index lens in which NA=0.75. In FIGS. 2A and 3A, reference numeral 1 designates the present gradient index lens, and what is shown there is a complete spherical lens. In the index gradient graphs of FIGS. 2B and 3B, the abscissa represents the distance $\rho$ from the center of the sphere, and the ordinate represents the refractive index $N(\rho)$.

As seen from the index gradient graphs of FIGS. 2B and 3B and the spherical aberration graphs of FIGS. 2C and 3C, there are provided gradient index lenses in which spherical aberration can be well corrected with the refractive index difference of the order of 0.15 and which are easy to make and have a sufficient imaging performance as a lens of this type.

The lenses shown are complete spherical lenses, but if only the portion of the effective diameter through which light rays pass is a spherical surface, the effect of the present invention can be sufficiently obtained, and the shapes of the lenses are not limited to the shapes shown in FIGS. 2A and 3A. Also, in the first to twenty-second embodiments, the focal length is standardized to f=1.0 for the purpose of normalization, but of course, the present invention materializes for any f(>0), and this also holds true of the lens diameter.

faces which are the light beam incidence and emergence surfaces are made coincident with each other.

In the gradient index lens according to the present

TABLE 1

| Embodiment | $N_0$ | $N_2 f^2$ | $N_3 f^3$ | $N_4 f^4$ | $N_5 f^5$ | $N_6 f^6$ | f | NA |
|---|---|---|---|---|---|---|---|---|
| 1 | 1.60 | $-3.49427 \times 10^{-1}$ | $+2.76398 \times 10^{-1}$ | $-5.87940 \times 10^{-1}$ | $-9.08062 \times 10^{-2}$ | $+6.35759 \times 10^{-1}$ | 1.0 | 0.95 |
| 2 | 1.63 | $-3.02780 \times 10^{-1}$ | 0 | $-2.57410 \times 10^{-1}$ | 0 | $+5.06530 \times 10^{-1}$ | 1.0 | 0.95 |
| 3 | 1.63 | $-3.43725 \times 10^{-1}$ | $+2.76896 \times 10^{-1}$ | $-6.50090 \times 10^{-1}$ | $-7.43507 \times 10^{-2}$ | $+7.65306 \times 10^{-1}$ | 1.0 | 0.95 |
| 4 | 1.63 | $-3.41733 \times 10^{-1}$ | $+2.62940 \times 10^{-1}$ | $-6.30744 \times 10^{-1}$ | $-6.28634 \times 10^{-2}$ | $+7.43670 \times 10^{-1}$ | 1.0 | 0.95 |
| 5 | 1.65 | $-3.46850 \times 10^{-1}$ | $+3.28840 \times 10^{-1}$ | $-7.83077 \times 10^{-1}$ | $-8.47604 \times 10^{-2}$ | $+9.41505 \times 10^{-1}$ | 1.0 | 0.95 |
| 6 | 1.65 | $-2.79025 \times 10^{-1}$ | $-1.66191 \times 10^{-1}$ | $-6.62159 \times 10^{-3}$ | $+1.51527 \times 10^{-1}$ | $+2.50566 \times 10^{-1}$ | 1.0 | 0.95 |
| 7 | 1.65 | $-3.01777 \times 10^{-1}$ | $-1.77390 \times 10^{-2}$ | $-1.89352 \times 10^{-1}$ | $+4.63906 \times 10^{-2}$ | $+4.28442 \times 10^{-1}$ | 1.0 | 0.95 |
| 8 | 1.65 | $-3.02592 \times 10^{-1}$ | 0 | $-2.31932 \times 10^{-1}$ | 0 | $+5.14772 \times 10^{-1}$ | 1.0 | 0.95 |
| 9 | 1.65 | $-2.99673 \times 10^{-1}$ | 0 | $-3.24254 \times 10^{-1}$ | 0 | $+6.57642 \times 10^{-1}$ | 1.0 | 0.98 |
| 10 | 1.68 | $-2.97383 \times 10^{-1}$ | 0 | $-3.17157 \times 10^{-1}$ | 0 | $+7.23719 \times 10^{-1}$ | 1.0 | 0.95 |
| 11 | 1.63 | $-3.04033 \times 10^{-1}$ | 0 | $-5.57519 \times 10^{-2}$ | 0 | $+1.81661 \times 10^{-1}$ | 1.0 | 0.75 |
| 12 | 1.65 | $-3.00404 \times 10^{-1}$ | 0 | $-5.90848 \times 10^{-2}$ | 0 | $+2.22102 \times 10^{-1}$ | 1.0 | 0.75 |
| 13 | 1.67 | $-2.96987 \times 10^{-1}$ | 0 | $-6.28492 \times 10^{-2}$ | 0 | $+2.67313 \times 10^{-1}$ | 1.0 | 0.75 |
| 14 | 1.70 | $-2.92223 \times 10^{-1}$ | 0 | $-6.97816 \times 10^{-2}$ | 0 | $+3.45177 \times 10^{-1}$ | 1.0 | 0.75 |
| 15 | 1.65 | $-3.02359 \times 10^{-1}$ | 0 | $+8.15385 \times 10^{-2}$ | 0 | 0 | 1.0 | 0.75 |
| 16 | 1.70 | $-2.93334 \times 10^{-1}$ | 0 | $+1.40163 \times 10^{-1}$ | 0 | 0 | 1.0 | 0.75 |
| 17 | 1.75 | $-2.84868 \times 10^{-1}$ | 0 | $+2.10866 \times 10^{-1}$ | 0 | 0 | 1.0 | 0.75 |
| 18 | 1.65 | $-3.01071 \times 10^{-1}$ | 0 | 0 | 0 | $+1.28901 \times 10^{-1}$ | 1.0 | 0.75 |
| 19 | 1.70 | $-2.92399 \times 10^{-1}$ | 0 | 0 | 0 | $+2.30194 \times 10^{-1}$ | 1.0 | 0.75 |
| 20 | 1.75 | $-2.84806 \times 10^{-1}$ | 0 | 0 | 0 | $+3.57897 \times 10^{-1}$ | 1.0 | 0.75 |
| 21 | 1.65 | $-3.00000 \times 10^{-1}$ | $-2.79807 \times 10^{-3}$ | $-7.32810 \times 10^{-2}$ | $+1.56338 \times 10^{-2}$ | $+2.18000 \times 10^{-1}$ | 1.0 | 0.75 |
| 22 | 1.65 | $-3.00000 \times 10^{-1}$ | $-5.44147 \times 10^{-3}$ | $-1.28806 \times 10^{-1}$ | $+2.43716 \times 10^{-1}$ | $+6.42899 \times 10^{-1}$ | 1.0 | 0.95 |

Further specific embodiments of the gradient index lens according to the present invention will be shown below.

Table 2 shows twenty-third to twenty-seventh numerical embodiments of the present gradient index lens. In Table 2, symbols and the form of description are similar to those in Table 1 above. In these embodiments, numerical values for d-line and g-line are shown and all the numerical values in Table 2 are values normalized with the focal length f for d-line as f=1.

Figure 4A:
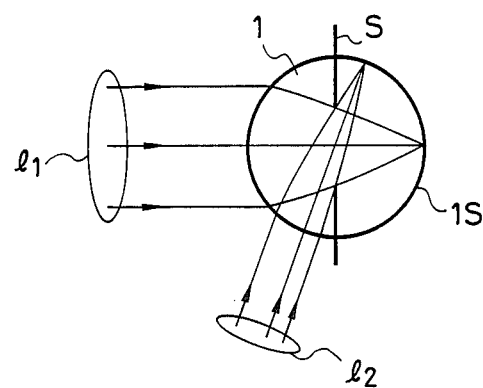
FIGS. 4A, 4B and 4C show a gradient index lens shown in the twenty-third to twenty-seventh embodiments of the numerical embodiments of the present invention, FIG. 4A being an optical path illustration, FIG. 4B being a graph of the index gradient, and FIG. 4C being a graph showing spherical aberration and chromatic aberration.
Figure 4B:
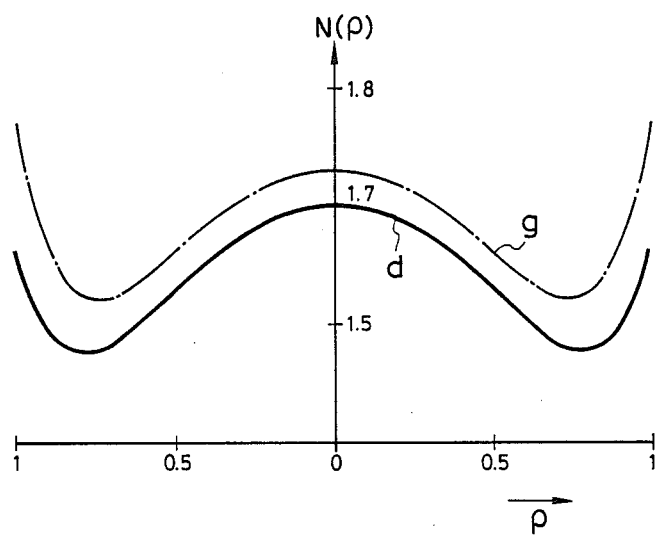
Figure 4C:
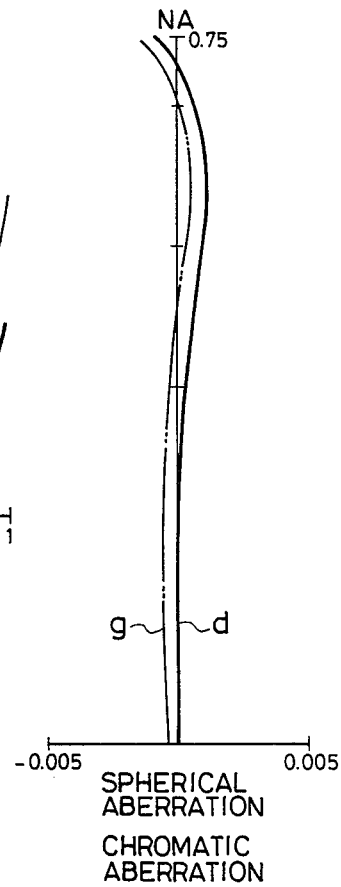

FIGS. 4A, 4B and 4C show the optical path, the index gradient and an example of spherical aberration and chromatic aberration, respectively, of the lens of the present embodiment. In the index gradient graph of FIG. 4B and the spherical aberration and chromatic aberration graph of FIG. 4C, the values for d-line and g-line are shown. In FIG. 4A, as in the previous embodiments, reference numeral 1 designates the present gradient index lens, S denotes a stop, and IS designates the spherical image surface which lies on the spherical surface of the present gradient index lens. Also, 11 designates the on-axis incident light beam, and 12 denotes the off-axis incident light beam.

The lens shown in FIG. 4A also is a complete spherical gradient index lens, but a sufficient effect can be obtained even if only the portion of the effective diameter through which light rays pass is a spherical surface. Accordingly, other various lens shapes than the spherical shape shown in FIG. 4A can also be designed, and the lens may take any shape if it is of a construction in which the centers of curvature of a pair of convex surfaces which are the light beam incidence and emergence surfaces are made coincident with each other.

In the gradient index lens according to the present embodiment, the index gradient thereof has such a characteristic as shown, for example, in FIG. 4B, that is, such a gradient which once decreases from the center to the peripheral portion for both of d-line and g-line and again increases. Also, dispersion is small at the center (great Abbe number) and is greater toward the peripheral portion (small Abbe number). Therefore, in addition to spherical aberration, chromatic aberration can also be well corrected as shown in FIG. 4C. Furthermore, by the image surface being made into a spherical image surface IS, the off-axis imaging characteristic can become about the same degree of characteristic as the on-axis imaging characteristic, and elimination of flare can be accomplished through the stop S and an even better imaging performance can be provided.

All the center refractive indices $N_0$ in the embodiments shown herein satisfy the aforementioned expression (1), i.e., $1.45 < N_0 < 1.9$, but to make the refractive index difference smaller and make the manufacture easier, it is preferable to make a design such that the value of $N_0$ satisfies $1.55 < N_0 < 1.75$.

Also, where the NA of the gradient index lens according to the present invention becomes great in conformity with the specification, the shape of the index gradient is set so as to have also the minimum value of the refractive index in the interior of the lens medium in accordance with the value of NA and the value of the center refractive index $N_0$. Accordingly, the embodiments shown in Tables 1 and 2 are divided into two types, i.e., the type which has such a shape of gradient and the type in which the refractive index simply decreases from the center.

TABLE 2

| Embodiment | λ | $N_0$ | $N_2 f^2$ | $N_3 f^3$ | $N_4 f^4$ | $N_5 f^5$ | $N_6 f^6$ | f | NA |
|---|---|---|---|---|---|---|---|---|---|
| 23 | d | 1.70000 | $-2.92501 \times 10^{-1}$ | 0 | $-3.08353 \times 10^{-2}$ | 0 | $2.82057 \times 10^{-1}$ | 1.0 | 0.75 |
|    | g | 1.73001 | $-2.88216 \times 10^{-1}$ | 0 | $-3.78707 \times 10^{-2}$ | 0 | $3.66039 \times 10^{-1}$ | | |
| 24 | d | 1.70514 | $-2.91741 \times 10^{-1}$ | 0 | $-3.09493 \times 10^{-2}$ | 0 | $2.94544 \times 10^{-1}$ | 1.0 | 0.75 |
|    | g | 1.72334 | $-2.88937 \times 10^{-1}$ | 0 | $-3.58183 \times 10^{-2}$ | 0 | $3.46505 \times 10^{-1}$ | | |
| 25 | d | 1.70514 | $-2.85724 \times 10^{-1}$ | 0 | $-3.51511 \times 10^{-4}$ | 0 | $2.15291 \times 10^{-1}$ | 1.0 | 0.50 |
|    | g | 1.72334 | $-2.82648 \times 10^{-1}$ | 0 | $7.50546 \times 10^{-3}$ | 0 | $2.42953 \times 10^{-1}$ | | |
| 26 | d | 1.70000 | $-2.92501 \times 10^{-1}$ | 0 | $-3.08353 \times 10^{-2}$ | 0 | $2.82057 \times 10^{-1}$ | 1.0 | 0.75 |
|    | g | 1.72189 | $-3.01647 \times 10^{-1}$ | 0 | $-3.17995 \times 10^{-2}$ | 0 | $2.90876 \times 10^{-1}$ | | |

TABLE 2-continued

| Embodiment | λ | $N_0$ | $N_2 f^2$ | $N_3 f^3$ | $N_4 f^4$ | $N_5 f^5$ | $N_6 f^6$ | f | NA |
|---|---|---|---|---|---|---|---|---|---|
| 27 | d | 1.70000 | $-2.92501 \times 10^{-1}$ | 0 | $-3.08353 \times 10^{-2}$ | 0 | $2.82057 \times 10^{-1}$ | 1.0 | 0.75 |
|  | g | 1.71592 | $-2.91426 \times 10^{-1}$ | 0 | $-3.76254 \times 10^{-2}$ | 0 | $2.96988 \times 10^{-1}$ |  |  |

Applications of the gradient index lens according to the present invention will hereinafter be described in detail.

Figure 5:
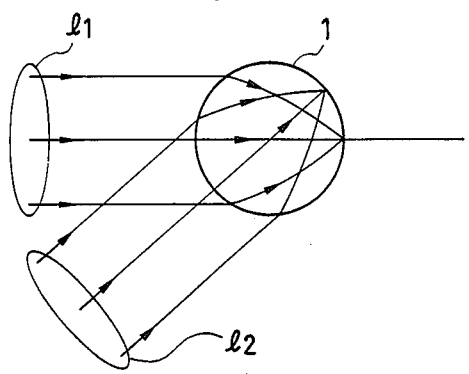
FIG. 5 shows the general on-axis and off-axis optical paths in the gradient index lens of the present invention.

Referring to FIG. 5 which shows the general on-axis and off-axis optical paths in the present gradient index lens, reference numeral 1 designates the present gradient index lens. The gradient index lenses of the embodiments shown in FIGS. 2-4 and the gradient index lens as shown in FIG. 5 are spherical lenses which are completely sphere-symmetrical with respect to the center of the sphere. Accordingly, as shown in the optical path illustration of FIG. 5, the off-axis light rays also are imaged on the rearward (image side) surface of the spherical lens with aberrations equal to those of the on-axis light rays. Thus, there can be provided a great aperture lens in which spherical aberration is almost corrected over a wide angle of view, but the imaging plane does not become a plane but becomes a spherical plane coincident with the rearward surface of the spherical lens, or a spherical plane concentric with the center of the spherical lens. In such a case, to make the most of the features of the present gradient index lens most effectively, a spherically-shaped image pickup element or reflecting film provided with a curvature substantially equal to the curvature of the lens, or a surface light source or the like may be disposed in intimate contact with or in proximity to the lens surface which is the imaging plane.

Figure 6:
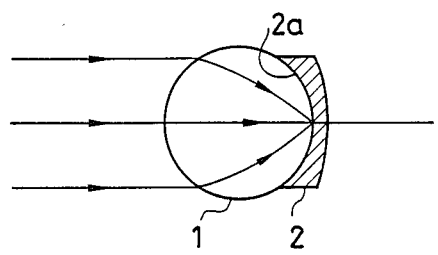
FIG. 6 shows an optical device comprising a combination of the gradient index lens of the present invention and an image pickup element.

FIG. 6 shows an optical device comprising a combination of the present gradient index lens and an image pickup element, and this device forms an image pickup optical system. In FIG. 6, reference numeral 2 designates the image pickup element, and reference character 2a denotes the photosensitive surface of the image pickup element 2. In the present embodiment, the photosensitive surface 2a is in intimate contact with the spherical surface of the gradient index lens 1. However, a construction may of course be also adopted in which the spherical surface and the photosensitive surface 2a are closely spaced apart from each other by a predetermined distance.

The photosensitive surface 2a of the image pickup element 2 forms a spherical shape having a curvature substantially equal to the curvature of the surface (spherical surface) of the gradient index lens. A light beam from an object lying at infinity enters the gradient index lens 1, is condensed by the refraction effect on the forward surface (the object side) of the lens and the refraction effect attributable to the index gradient in the interior of the lens, and is imaged on the photosensitive surface 2a which is in intimate contact with the rearward surface of the lens. Accordingly, as described in connection with FIG. 5, an image which is bright over a wide angle of view and which has small aberrations can be picked up by the image pickup element 2, and the present device is a device applicable to the eye of a robot or the like. Also, the image pickup element 2 may be a CCD or the like.

Figure 7:
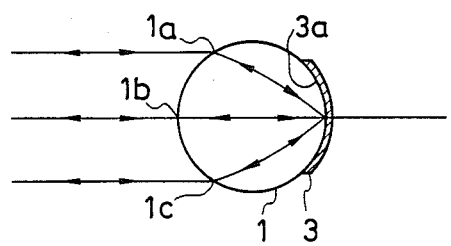
FIG. 7 shows an optical device in which a light-reflecting film is provided on the surface of the gradient index lens of the present invention.

FIG. 7 shows an optical device in which a light-reflecting film is provided on the surface of the present gradient index lens, and this device forms a reflecting optical system. In FIG. 7, reference numeral 3 designates the light-reflecting film, and reference character 3a denotes the reflecting surface of the light-reflecting film 3. The reflecting surface 3a is in intimate contact with the rearward surface of the gradient index lens 1. The light-reflecting film 3 may be formed as by evaporating a metal of high reflectivity such as aluminum on the surface of the gradient index lens, but instead of forming the light-reflecting film 3 directly on the gradient index lens 1, the light-reflecting film 3 may be formed on a member having the same curvature as the curvature of the surface of the present gradient index lens 1 and may be disposed in intimate contact with or in proximity to the present gradient index lens 1 or a small concave mirror provided with a reflecting surface 3a may be disposed in proximity to the present gradient index lens.

A light beam from an object lying at infinity enters the present gradient index lens 1 and passes through the interior of the lens, whereafter it is imaged on the reflecting surface 3a of the light-reflecting film 3. This light beam is then reflected by the reflecting surface 3a and again passes through the interior of the lens, whereafter it emerges in a direction parallel but opposite to the direction of incidence. That is, the light ray incident on a point 1b (the point of intersection with the optic axis) on the surface of the present gradient index lens 1 is reflected by the reflecting surface 3a and travels on the same optical path in the opposite direction, while the light ray incident on an off-axis point 1a is reflected by the reflecting surface 3a, whereafter it emerges from a point 1c and conversely, the light ray incident on the off-axis point 1c is reflected by the reflecting surface 3a, whereafter it emerges from the point 1a and after all, in the present optical device, the incident light beam is converted to an emergent light beam parallel but opposite to the direction of incidence and thus, the present optical device forms a so-called cat's eye optical system.

Figure 8:
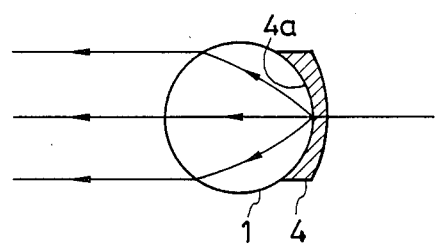
FIG. 8 shows an optical device comprising a combination of the gradient index lens of the present invention and a light source.

FIG. 8 shows an optical device comprising a combination of the present gradient index lens and a light source. In FIG. 8, reference numeral 4 designates a surface light source, and reference character 4a denotes the light-emitting surface of the surface light source 4. Again in this embodiment, as in the previously described embodiments, the light-emitting surface 4a is disposed in intimate contact with or in proximity to the surface of the present gradient index lens 1, and the light-emitting surface 4a forms a spherical shape having a curvature substantially equal to the curvature of the surface of the present gradient index lens 1.

A light beam emitted from a point (light-emitting point) on the light-emitting surface 4a of the surface light source 4 travels as a parallel light beam in the direction of the extension of the line passing through the light-emitting point and the center of the sphere. Accordingly, if the area of the light-emitting surface 4a is wide, a light of uniform intensity can be directed over a wide angle and thus, an excellent illuminating system can be provided.

In FIGS. 7 and 8, only the on-axis light ray is shown, but of course, the off-axis light ray is also imaged exhibiting a similar behavior. Also, the sizes (the solid angles from the center of the sphere) of the image pickup element 2, the light-reflecting film 3 and the surface light source 4 in the respective embodiments can be suitably selected from a size approximate to a point to a size covering a semisphere, in conformity with the intended use. Further, an optical device in a form wherein the embodiments shown in FIGS. 6 to 8 are compounded is also possible, such as an optical system in which an image pickup element having a light-reflecting property is used to pick up the image of an object and reflected light is utilized for other use, or an optical system in which a material for time-serially changing over the function of a light-emitting element and the function of a light-receiving (image pickup) element is disposed in intimate contact with or in proximity to a gradient index lens.

Figure 9:
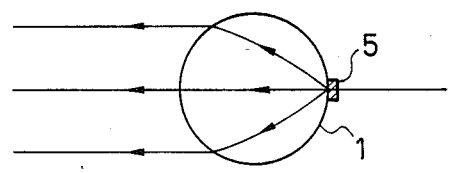
FIGS. 9 and 10 show optical devices comprising a combination of the gradient index lens and a point light source or sources.
Figure 10:
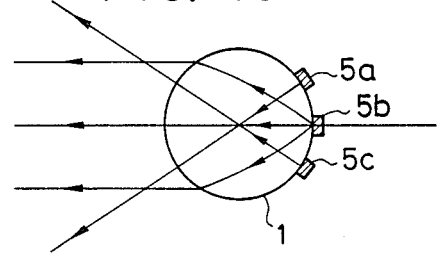

FIGS. 9 and 10 show optical devices comprising a combination of the present gradient index lens and a point light source or sources. FIG. 9 shows an embodiment which uses a single point light source, and FIG. 10 shows an embodiment which uses a plurality of point light sources. In these figures, reference characters 5, 5a, 5b and 5c designate the point light sources.

The point light sources 5, 5a, 5b and 5c include light-emitting diodes, semiconductor lasers and the like. In FIG. 9, a light beam emitted from the point light source 5 is collimated by the gradient index lens 1 and is directed as a parallel light beam from the present gradient index lens 1 in a direction passing through the point light source 5 and the center of the sphere. In FIG. 10, light beams emitted from the point light sources 5a, 5b and 5c are collimated by the gradient index lens 1 and are directed as parallel light beams from the present gradient index lens 1 in different directions passing through the respective point light sources and the center of the sphere.

FIGS. 11-14 show optical devices comprising a combination of the present gradient index lens and an optical fiber or fibers.

Figure 11:
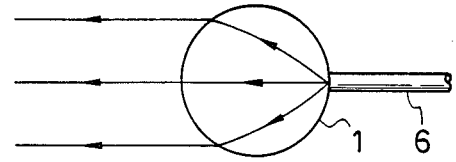
FIGS. 11 to 14 show optical devices comprising a combination of the gradient index lens or lenses of the present invention and an optical fiber or fibers.

FIG. 11 shows an embodiment of an optical system for collimating the light from an optical fiber. In FIG. 11, reference numeral 1 designates the present gradient index lens, and reference numeral 6 denotes an optical fiber having one end surface thereof disposed in intimate contact wit or in proximity to the present gradient index lens 1. A light emitted from the end surface of the optical fiber 6 is converted to a parallel light beam by the present gradient index lens 1, as shown.

Figure 12:
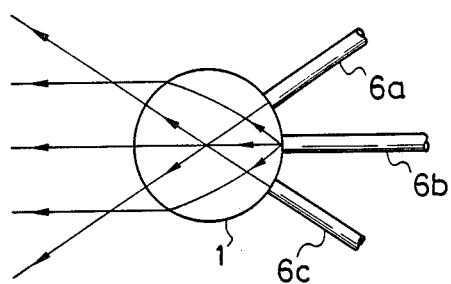

FIG. 12 shows an embodiment which uses a plurality of optical fibers instead of a single optical fiber. Designated by 6a, 6b and 6c are the optical fibers each having one end surface thereof disposed in intimate contact with or in proximity to the present gradient index lens 1. Lights emitted from the different optical fibers 6a, 6b and 6c pass through the present gradient index lens 1 and travel as parallel light beams in different directions.

Figure 13:
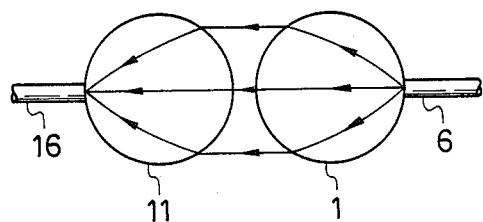

FIG. 13 shows an embodiment in which two sets of the optical system of FIG. 11 are used and the present gradient index lens is constructed as the connector for optical fibers.

In FIG. 13, reference numeral 11 designates a gradient index lens, and reference numeral 16 denotes an optical fiber having one end surface thereof disposed in intimate contact with or in proximity to the lens 11. Two optical fibers 6 and 16 are disposed so that their end surfaces lie on a straight line passing through the centers of the two gradient index lenses 1 and 11. A light emitted from the fiber 6 passes through the gradient index lens 1, emerges as a parallel light beam from the gradient index lens 1, and then enters the gradient index lens 11, passes through the interior of the gradient index lens 11, and finally enters the optical fiber 16 disposed in intimate contact with or in proximity to the surface of the gradient index lens 11. By adopting the construction as described above, optical coupling can be easily accomplished between the two fibers 6 and 16.

Figure 14:
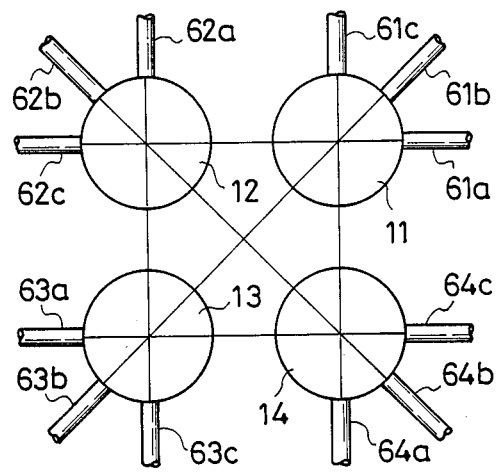

FIG. 14 shows an embodiment as an optical connector for realizing a number of optical couplings by a small number of lenses. In FIG. 14, reference numerals 11-14 designate gradient index lenses, and reference characters 61a, 61b, 61c, . . . , 64a, 64b, 64c denote optical fibers each having one end surface thereof disposed in intimate contact with or in proximity to the surface of the respective gradient index lenses 11-14. In this optical system, six pairs of optical fibers (61a, 62c), (61b, 63b), (61c, 64a), (62a, 63c), (62b, 64b) and (63a, 64c) are optically coupled. If the connector shown in FIG. 11 is used to cause the same function as this to be performed, twelve lenses will be required, but the construction of the present embodiment requires only four lenses, and this leads to compactness and low cost of the device. Also in the present embodiment, the gradient index lenses are arranged in a square shape, but for example, other polygonal arrangement may also be adopted, and it is also possible to realize a cubic arrangement and effect couplings between a greater number of optical fibers.

As described above, when the present gradient index lens or lenses and a light source or sources or an optical fiber or fibers are to be combined, the optical characteristics of the respective optical systems are taken into consideration and the index gradient of the present gradient index lens or lenses is controlled to a desired gradient, whereby it is possible to provide optical devices of high performance.

In the embodiments of FIGS. 5-14, a diaphragm for limiting the light beam is not shown, whereas it is to be understood that these embodiments include ones in which a diaphragm or diaphragms are added. Such diaphragms include not only popular diaphragms but also a diaphragm comprising a non-light transmitting material applied to the surface of the spherical lens, and adoption of such a construction leads to simplicity of the device.

The spherical lenses shown in Tables 1 and 2 are designed on the assumption that the object is at infinity, but in practical use, if the sharpness of image is within the tolerance, objects at finite distances may be objects to be photographed.

Regarding the applications to objects at finite distances, the smaller is the focal length of the present gradient index lens, focusing is possible to the closer distance position. For example, if the lens of the embodiment shown in Table 1 in which aberrations are well corrected and NA is 0.75 is used at f=1.0 mm, the diameter of the point image will be about 1 μm when the object is at infinity, and will be about 30 μm when the object is at a distance of 50 mm from the spherical lens.

These are aberrations within the tolerance when in the embodiment shown, for example, in FIG. 5, image pickup is effected by the use of an image pickup element 2 having a resolving power approximate to that of a silver salt film. Thus, focusing is possible to any object which is at a distance greater than 50 mm. Thus, according to the present gradient index lens of a small focal length f, there can be provided an image pickup optical system which does not practically require focusing.

The various applications shown above can readily assume other forms by suitably designing the devices, and if optical devices are made by combining the respective applications, further various novel devices can be formed.

In each embodiment described above, there has been shown a biconvex lens comprising a pair of convex surfaces sharing the center of curvature of a spherical lens or the like. However, in the case shown, for example, in FIG. 9 or 11 wherein a divergent light emitted from a particular light-emitting point is converted to a parallel light beam or the like, the surface adjacent to the light-emitting point need not be a convex surface, but may be a planar surface or a curved surface of other configuration. That is, the gradient index lens of the present invention can be designed in any form if at least one surface thereof is a convex surface and the lens has a spherical index gradient whose center is the center of curvature of said convex surface and satisfies the aforementioned conditions (1) and (2). However, it is desirable that said light-emitting point or the imaged position of the light beam be at a position far from the center of curvature by a distance equivalent to the radius of curvature of the convex surface.

We claim:

1. A gradient index lens including;
a first surface comprising a convex surface;
a second surface comprising a convex surface, the convex surface of said second surface sharing the center of curvature with the convex surface of said first surface; and
an index gradient $N(\rho)$ formed in the medium of said lens, said index gradient $N(\rho)$ being expressed as $$N(\rho)=N_0+N_2\rho^2+N_3\rho^3+N_4\rho^4+N_5\rho^5+\ldots,$$

where $N_0$ is the refractive index at said center of curvature, $N_k$ ($k=2, 3, 4, \ldots$) are the index gradient coefficients, and $\rho$ is the distance from said center of curvature, and at least one of the index gradient coefficients $N_k$ in which $k \geq 3$ is greater than 0; and
said lens satisfying the following conditions:
$1.45 < N_0 < 1.9$
$-0.4 < N_2 f^2 < -0.2$
where f is the focal length of said lens.

2. A gradient index lens according to claim 1, wherein the configuration of said lens is spherical.

3. A gradient index lens according to claim 1, wherein said central refractive index $N_0$ further satisfies the following condition:
$1.55 < N_0 < 1.75$.

4. A gradient index lens according to claim 1, wherein said index gradient $N(\rho)$ has its index gradient coefficients $N_k$ set so that the minimum value of the refractive index exists in the other portion of the medium of said lens than the surface of said lens.

5. A gradient index lens according to claim 1, wherein said index gradient $N(\rho)$ has its index gradient coefficients $N_k$ set so that the minimum value of the refractive index exists in the other portion of the medium of said lens than the surface of said lens.

6. A gradient index lens including:
a first surface comprising a convex surface;
a second surface lying on the opposite side to said first surface with the medium of said lens interposed therebetween; and
an index gradient $N(\rho)$ formed in said medium, said index gradient $N(\rho)$ satisfying the following conditions:

$$N(\rho)=N_0+N_2\rho^2+N_3\rho^3+N_4\rho^4+N_5\rho^5+\ldots$$

$1.45 < N_0 < 1.9$
$-0.4 < N_2 f^2 < -0.2$
where $N_0$ is the refractive index at the center of curvature of said convex surface, $N_k$ ($k=2, 3, 4, \ldots$) are the index gradient coefficients, $\rho$ is the distance from said center of curvature, and f is the focal length of said lens, and at least one of said index gradient coefficients $N_k$ in which $k \geq 3$ is greater than 0.

7. An image pickup optical system including:
a biconvex single lens, the pair of convex surfaces of said lens sharing the center of curvature; and
an image pickup element provided with a curved image pickup surface, said image pickup surface of said image pickup element being formed along one of said pair of convex surfaces, wherein said biconvex single lens has an index gradient $N(\rho)$ in the medium thereof, said index gradient $N(\rho)$ being expressed as $$N(\rho)=N_0+N_2\rho^2+N_3\rho^3+N_4\rho^4+N_5\rho^5+\ldots,$$

where $N_0$ is the refractive index at said center of curvature, $N_k$ ($k=2, 3, 4, \ldots$), are the index gradient coefficients, $\rho$ is the distance from said center of curvature, at least one of the index gradient coefficients $N_k$ in which $k \geq 3$ is greater than 0, and said biconvex single lens satisfies the following conditions:
$1.45 < N_0 < 1.9$
$-0.4 < N_2 f^2 < -0.2$
where f is the focal length of said biconvex single lens.

8. An image pickup optical system according to claim 7, wherein said image pickup surface is an image pickup surface having a radius of curvature $r_i$ which satisfies the following condition:

$$f \leq r_i \leq sf/(s-f)$$

where f is the focal length of said biconvex single lens, and s is the distance from the object point to said center of curvature, and the relative position of said image pickup surface and said biconvex single lens is varied to accomplish the focusing of said object point onto said image pickup surface.

9. An image pickup optical system according to claim 7, wherein said image pickup surface is an image pickup surface having a radius of curvature ri which satisfies the following condition:

$$f \leq r_i \leq f + \frac{f^2}{2(s-f)},$$

where f is the focal length of said biconvex single lens, and s is the distance from the object point to said center of curvature, and the relative position of said image pickup surface and said biconvex single lens is varied to accomplish the focusing of said object point onto said image pickup surface.

10. A gradient index lens for focusing an infinity object point on a lens surface, comprising:
   a first surface comprising a convex surface;
   a second surface comprising a convex surface, the convex surface of said second surface sharing the center of curvature with the convex surface of said first surface; and
   an index gradient $N(\rho)$ formed in the medium of said lens, said index gradient $N(\rho)$ being expressed as $$N(\rho) = N_0 + N_2\rho^2 + N_3\rho^3 + N_4\rho^4 + N_5\rho^5 + \ldots,$$

where $N_0$ is the refractive index at said center of curvature, $N_k$ ($k = 2, 3, 4, \ldots$) are the index gradient coefficients, and $\rho$ is the distance from said center of curvature, at least one of the index gradient coefficients $N_k$ in which $K \geq 3$ being greater than 0, and
   said lens satisfying the following conditions:
   $1.45 < N_0 < 1.9$
   $-0.4 < N_2 f^2 < -0.2$
   where f is the focal length of said lens.

11. A gradient index lens according to claim 10, wherein the configuration of said lens is spherical.

12. A gradient index lens according to claim 10, wherein said central refractive index $N_0$ further satisfies the following condition:
   $1.55 < N_0 < 1.75$ 13. A gradient index lens for focusing an infinity object point on a lens surface, comprising:
   a first surface comprising a convex surface;
   a second surface lying on the opposite side to said first surface with the medium of said lens interposed therebetween; and
   an index gradient $N(\rho)$ formed in said medium, said index gradient $N(\rho)$ satisfying the following conditions:

$$N(\rho) = N_0 + N_2\rho^2 + N_3\rho^3 + N_4\rho^4 + N_5\rho^5 + \ldots,$$

$1.45 < N_0 < 1.9$
   $-0.4 < N_2 f^2 < -0.2$
   where $N_0$ is the refractive index at the center of curvature of said convex surface, $N_k$ ($k = 2, 3, 4, \ldots$) are the index gradient coefficients, $\rho$ is the distance from said center of curvature, and f is the focal length of said lens, at least one of said index gradient coefficients $N_k$ in which $K > 3$ being greater than 0.

14. An image pickup optical system including:
   a biconvex single lens for focusing an infinity object point on a lens surface, the pair of convex surfaces of said lens sharing the center of curvature; and
   an image pickup element provided with a curved image pickup surface, said image pickup surface of said image pickup element being formed along one of said pair of convex surfaces, wherein said biconvex single lens has an index gradient $N(\rho)$ in the medium thereof, said index gradient $N(\rho)$ being expressed as $$N(\rho) = N_0 + N_2\rho^2 + N_3\rho^3 + N_4\rho^4 + N_5\rho^5 + \ldots,$$

where $N_0$ is the refractive index at said center of curvature, $N_k$ ($k = 2, 3, 4, \ldots$) are the index gradient coefficients, and $\rho$ is the distance from said center of curvature, at least one of the index gradient coefficients $N_k$ in which $k > 3$ greater than 0, and said biconvex single lens satisfies the following conditions:
   $1.45 < N_0 < 1.9$
   $-0.4 < N_2 f^2 < -0.2$
   where f is the focal length of said biconvex single lens.

15. An image pickup optical system according to claim 14, wherein said image pickup surface is an image pickup surface having a radius of curvature ri which satisfies the following condition:

$$f \leq r_i \leq sr/(s - f)$$

where f is the focal length of said biconvex single lens, and s is the distance from the object point to said center of curvature, and the relative position of said image pickup surface and said biconvex single lens is varied to accomplish the focusing of said object point onto said image pickup surface.

16. An image pickup optical system according to claim 14, wherein said image pickup surface is an image pickup surface having a radius of curvature $r_i$ which satisfies the following condition:

$$f \leq r_i \leq f + \frac{f^2}{2(s - f)},$$

where f is the focal length of said biconvex single lens, and s is the distance from the object point to said center of curvature, and the relative position of said image pickup surface and said biconvex single lens is varied to accomplish the focusing of said object point said image pickup surface.

17. An optical apparatus including:
   a biconvex single lens, the pair of convex surfaces of said lens sharing the center of curvature; and
   a light source, the light emitting point of said light source being positioned in operable association with one of said pair of convex surfaces, wherein said biconvex single lens has an index gradient $N(\rho)$ in the medium thereof, said index gradient $N(\rho)$ being expressed as $$N(\rho) = N_0 + N_2\rho^2 + N_3\rho^3 + N_4\rho^4 + N_5\rho^5 + \ldots,$$

where $N_0$ is the refractive index at said center of curvature, $N_k$ ($k = 2, 3, 4 \ldots$) are the index gradient coefficients, and $\rho$ is the distance from said center of curvature, at least one of the index gradient coefficients $N_k$ in which $k \geq 3$ is greater than 0, and said biconvex single lens satisfies the following conditions:
   $1.45 < N_0 < 1.9$
   $-0.4 < N_2 f^2 < -0.2$
   where f is the focal length of said biconvex single lens.

18. An optical apparatus including:
   a biconvex single lens, the pair of convex surfaces of said lens sharing the center of curvature; and
   an optical fiber, the end surface of said optical fiber being positioned in operable association with one of said pair of convex surfaces, wherein said biconvex single lens has an index gradient $N(\rho)$ in the medium thereof, said index gradient $N(\rho)$ being expressed as $$N(\rho) = N_0 + N_2\rho^2 + N_3\rho^3 + N_4\rho^4 + N_5\rho^5 + \ldots,$$

where $N_0$ is the refractive index at said center of curvature, $Nk$ ($k=2, 3, 4, \ldots$) are the index gradient coefficients, and $\rho$ is the distance from said center of curvature, at least one of the index gradient coefficients $Nk$ in which $k \geq 3$ is greater than 0, and said biconvex single lens satisfies the following conditions:

$1.45 < N_0 < 1.9$
$-0.4 < N_2 f^2 < -0.2$ where f is the focal length of said biconvex single lens.

19. A reflecting optical system including:

a biconvex single lens, the pair of convex surfaces of said lens charging the center of curvature; and an optical element having a curved reflecting surface, said reflecting surface being positioned so as to be in operable association with one of said pair of convex surfaces, wherein said biconvex single lens has an index gradient $N(\rho)$ in the medium thereof, said index gradient $N(\rho)$ being expressed as $$N(\rho) = N_0 + N_2 \rho^2 + N_3 \rho^3 + N_4 \rho^4 + N_5 \rho^5 + \ldots,$$

where $N_0$ is the refractive index at said center of curvature, $Nk$ ($k=2, 3, 4, \ldots$) are the index gradient coefficients, and $\rho$ is the distance from said center of curvature, at least one of the index gradient coefficients $Nk$ in which $k \geq 3$ is greater than 0, and said biconvex single lens satisfies the following conditions:

$1.45 < N_0 < 1.9$
$-0.4 < N_2 f^2 < -0.2$ where f is the focal length of said biconvex single lens.

20. A reflecting optical system including:

a biconvex single lens, the pair of convex surfaces of said lens sharing the center of curvature; and an optical reflecting film having a curved reflecting surface, said reflecting surface being positioned in operable association with one of said pair of convex surfaces, wherein said biconvex single lens has an index gradient $N(\rho)$ in the medium thereof, said index gradient $N(\rho)$ being expressed as $$N(\rho) = N_0 + N_2 \rho^2 + N_3 \rho^3 + N_4 \rho^4 + N_5 \rho^5 + \ldots,$$

where $N_0$ is the refractive index at said center of curvature, $Nk$ ($k=2, 3, 4, \ldots$) are the index gradient coefficients, and $\rho$ is the distance from said center of curvature, at least one of the index gradient coefficients $Nk$ in which $k \geq 3$ is greater than 0, and said biconvex single lens satisfies the following conditions:

$1.45 < N_0 < 1.9$
$-0.4 < N_2 f^2 < -0.2$ where f is the focal length of said biconvex single lens.

* * * * *

UNITED STATES PATENT AND TRADEMARK OFFICE
CERTIFICATE OF CORRECTION

PATENT NO. : 4,848,882
DATED : July 18, 1989
INVENTOR(S) : MASAYUKI SUZUKI ET AL.

Page 1 of 2

It is certified that error appears in the above-identified patent and that said Letters Patent is hereby corrected as shown below:

AT [57] ABSTRACT

Line 8, "$N_{(p)} = N_0 + N_{2p}^2 + N_{3p}^3 N_{4p}^4 + N_{5p}^5 + ...$" should read --$N_{(p)} = N_0 + N_{2p}^2 + N_{3p}^3 + N_{4p}^4 + N_{5p}^5 + ...,$--.

COLUMN 4

Line 17, "an available," should read --unavailable,-- and ".to" should read --to--.

COLUMN 5

Line 33, "the f" should read --where f--.

COLUMN 6

Line 17, "called to" should read --taken into--.
Line 25, "lens" should read --lens.--.

COLUMN 7

Line 47, "11" should read --$\ell_1$--.
Line 48, "12" should read --$\ell_2$--.

COLUMN 8

Line 47, "$1.55 < N_0 < 1.75$." should read --$1.55 \leq N_0 \leq 1.75$.--.

COLUMN 15

Line 49, "$k > 3$" should read --$k \geq 3$--.

UNITED STATES PATENT AND TRADEMARK OFFICE
CERTIFICATE OF CORRECTION

PATENT NO. : 4,848,882
DATED : July 18, 1989
INVENTOR(S) : MASAYUKI SUZUKI ET AL.   Page 2 of 2

It is certified that error appears in the above-identified patent and that said Letters Patent is hereby corrected as shown below:

COLUMN 16

Line 1, "k>3" should read --$k \geq 3$ is--.
Line 13, "$f \leq r_i \leq sr/(s-f)$" should read --$f \leq r_i \leq sf/(s-f)$--.
Line 33, "point said" should read --point onto said--.

COLUMN 17

Line 15, "charging" should read --sharing--.

Signed and Sealed this

Twenty-eighth Day of April, 1992

Attest:

HARRY F. MANBECK, JR.

*Attesting Officer*   *Commissioner of Patents and Trademarks*